(12) United States Patent
Sasahara et al.

(10) Patent No.: US 7,700,218 B2
(45) Date of Patent: Apr. 20, 2010

(54) FUEL CELL

(75) Inventors: Jun Sasahara, Kawagoe (JP); Daniel Braithwaite, Rowland Heights, CA (US); Suk-Won Cha, Stanford, CA (US); Tibor Fabian, Menlo Park, CA (US); Tadahiro Kubota, Asaka (JP); Nariaki Kuriyama, Fujimi (JP); Sang-Joon John Lee, Sunnyvale, CA (US); Ryan O'Hayre, Castle Rock, CO (US); Friedrich B. Prinz, Woodside, CA (US); Yuji Saito, Palo Alto, CA (US); Toshifumi Suzuki, Fuchu (JP)

(73) Assignees: The Board of Trustees of the Leland Stanford Junior University, Palo Alto, CA (US); Honda Motor Co., Ltd, Tokyo (JP)

( * ) Notice: Subject to any disclaimer, the term of this patent is extended or adjusted under 35 U.S.C. 154(b) by 185 days.

(21) Appl. No.: 12/004,139

(22) Filed: Dec. 19, 2007

(65) Prior Publication Data

US 2008/0102324 A1    May 1, 2008

Related U.S. Application Data

(62) Division of application No. 10/435,610, filed on May 9, 2003, now Pat. No. 7,341,800.

(60) Provisional application No. 60/379,524, filed on May 9, 2002, provisional application No. 60/408,732, filed on Sep. 6, 2002, provisional application No. 60/458,116, filed on Mar. 26, 2003.

(51) Int. Cl.
*H01M 2/00* (2006.01)
*H01M 2/02* (2006.01)
*H01M 2/14* (2006.01)

(52) U.S. Cl. .............................. 429/38; 429/34; 429/39
(58) Field of Classification Search .................. 429/38, 429/39, 12, 115, 34
See application file for complete search history.

(56) References Cited

U.S. PATENT DOCUMENTS 5,300,370 A * 4/1994 Washington et al. .......... 429/34
6,835,488 B2 * 12/2004 Sasahara et al. ............... 429/39

* cited by examiner

*Primary Examiner*—Patrick Ryan
*Assistant Examiner*—Julian Mercado
(74) *Attorney, Agent, or Firm*—Lumen Patent Firm

(57) ABSTRACT

A simple, inexpensive and highly efficient fuel cell has boundary structures made of a photo-sensitive material in combination with selective patterning. Printed circuit board (PCB) fabrication techniques combine boundary structures with two and three dimensional electrical flow path. Photo-sensitive material and PCB fabrication techniques are alternately or combined utilized for making micro-channel structures or micro stitch structures for substantially reducing dead zones of the diffusion layer while keeping fluid flow resistance to a minimum. The fuel cell assembly is free of mechanical clamping elements. Adhesives that may be conductively contaminated and/or fiber-reinforced provide mechanical and eventual electrical connections, and sealing within the assembly. Mechanically supporting backing layers are pre-fabricated with a natural bend defined in combination with the backing layers' elasticity to eliminate massive support plates and assist the adhesive bonding. Proton insulation between adjacent and electrically linked in-plane cell elements is provided by structural insulation within the central membrane.

3 Claims, 15 Drawing Sheets

FUEL CELL

CROSS-REFERENCE TO RELATED APPLICATIONS

This application is a divisional of U.S. patent application Ser. No. 10/435,610, filed May 9, 2003 and now issued as U.S. Pat. No. 7,341,800, which is incorporated herein by reference. U.S. patent application Ser. No. 10/435,610, filed May 9, 2003 claims the benefit of U.S. patent application No. 60/379,524 filed May 9, 2002, U.S. patent application 60/408,732 filed Sep. 6, 2002, and U.S. patent application 60/458,116 filed Mar. 26, 2003, all of which are hereby incorporated by reference.

FIELD OF INVENTION

The invention relates generally to fuel cells, and more specifically to fuel cells preferably constructed from photo-patterned laminates, preferably bonded with fiber-reinforced adhesive and having massively parallel distribution channels.

BACKGROUND OF INVENTION

A fuel cell is an electromechanical device that produces electrical current from chemical reactions. The essential form of a fuel cell includes an ion-conducting electrolyte between two electrodes that are backed by fuel and oxidant flow distributors. A catalyst on one electrode, i.e. the anode, promotes separation of ions and electrons at the fuel side. It is only the ions that pass through the electrolyte which then at the oxidant site, i.e. the cathode, recombine with electrons. The electrons are conducted through an external circuit therewith supplying electrical power. Excellent overviews of fuel cell technology can be obtained from the following references:

"*Fuel Cell Systems Explained*" edited by J. Larminie and A. Dicks and published by John Wiley and Sons (2000) or in a book entitled "*Fuel Cell Technology Handbook*" edited by G. Hooger and published by CRC Press (2003);

Related exemplary teachings can be found in U.S. Pat. No. 5,641,586, issued to Wilson, Jun. 24, 1997, titled "FUEL CELL WITH INTERDIGITATED POROUS FLOW-FIELD";

U.S. Pat. No. 5,683,828, issued to Spear et al., Nov. 4, 1997, titled "METAL PLATELET FUEL CELLS PRODUCTION AND OPERATION METHODS";

S. J. Lee, S. W. Cha, Y. C. Liu, R. O'Hayre, F. B. Prinz, "High Power-Density Polymer-Electrolyte Fuel Cells by Microfabrication", in *Micro Power Sources*, K. Zaghib and S. Surampudi (eds.), Proceedings, V. 2000-3, The Electrochemical Society Proceeding Series, Pennington, N.J., 2000;

S. J. Lee, S. W. Cha, R. O'Hayre, A. Chang-Chien, F. B. Prinz, "Miniature Fuel Cells with Non-Planar Interface by Microfabrication", in *Power Sources for the New Millennium*, M. Jain, M. A. Ryan, S. Surampudi, R. A. Marsh, and G. Nagarajan (eds.), Proceedings, V. 2000-22, The Electrochemical Society Proceeding Series, Pennington, N.J., 2000;

R. O'Hayre, T. Fabian, S. J. Lee, F. B. Prinz, "Lateral Ionic Conduction in Planar Array Fuel Cells", Journal of the Electrochemical Society, Volume 150, Number 4, April 2003, pp. A430-A438; and S. J. Lee, A. Chang-Chien, S. W. Cha, R. O'Hayre, Y. I. Park, Y. Saito, F. B. Prinz, "Design and Fabrication of a Micro Fuel Cell Array with 'Flip-Flop' Interconnection", Journal of Power Sources, Volume 112, Issue 2, November 2002, pp. 410-418.

Prior art FIG. 1 shows a cross-section side view of a conventional fuel cell assembly. The assembly includes a membrane electrolyte 9 with catalyst-loaded gas diffusion layer 2 on either major face of membrane electrolyte 9. The primary electrochemical reaction occurs at the interface between membrane electrolyte 9 and its adjacent catalyst-loaded gas diffusion layer 2. The membrane-electrode assembly is interposed between two backing layers 30. Backing layers 3 are manufactured to allow for open passages 31 for reactant flow. The open passages in conventional fuel cells are either parallel or serially arranged distribution channels that distribute the reactant fluid along the gas diffusion layer 2. For optimum operation it is desirable to distribute the reactant fluid as evenly as possible with minimal pressure and flow variances while keeping the design space for the distribution channels to a minimum. The present invention addresses this need.

In order to keep the different components together and isolate reactants at either side of membrane electrolyte 9, prior art fuel cells employ a mechanical clamping structure that may include threaded fasteners 4 such as bolts and/or nuts and other well-known mechanical clamping elements such as plates 41 and the like. In prior art fuel cells, the mechanical compression of the fuel cell's core structure within the inner boundaries of a surrounding elastomer gasket 5 may influence the fuel cell's efficiency. It is noted that the elastomer gasket 5 is positioned between the membrane electrolyte 9 and backing layers to isolate reactants on either side of membrane electrolyte 9. Consequently, the mechanical structure involved for providing the required compressive force and for evenly distributing that compressive force across the fuel cell's core structure increases the fuel cell's over all size, complexity and fabrication cost.

An alternative approach has been introduced in the prior art to keep the different components together and to isolate reactants at either side of membrane electrolyte 1 without relying on a clamping mechanism. In this alternate approach pure adhesives are used. However, bonding of a membrane electrolyte with pure adhesives introduces severe assembly challenges due to compatibility issues between the membrane electrolyte and the pure adhesive. Furthermore, pure adhesives are known to fail readily when subject to expansion of the membrane electrolyte as well as varying degrees of moisture content. Accordingly, there is a need in the art for a fuel cell assembly that may be efficiently fabricated and operated without need of a mechanical clamping structure and that takes into account the limitations of pure adhesives used for bonding fuel cell elements. The present invention addresses this needs.

SUMMARY OF THE INVENTION

Several aspects of the invention contribute to an improved fuel cell that simple and inexpensive to fabricate and highly efficient in operation. The main aspects are:
- use of a photo-sensitive material in combination with selective patterning for building two and three dimensional boundary structures for fluid conductance;
- use of printed circuit board (PCB) fabrication techniques to combine boundary structures with two and three dimensional electrical flow path;
- alternating and/or combined application of photo-sensitive material and PCB fabrication techniques for making micro-channel structures and micro stitch structures for substantially reducing dead zones of the diffusion layer;

use of adhesive bonding for a fuel cell assembly without mechanical clamping elements, for electrically conductive connections by adding a metallic compound to the adhesive;

fiber-reinforcing the adhesive for increased stiffness of bonding areas, building structurally supporting seals and for fiber penetration of the central membrane;

pre-fabricating mechanically supporting backing layers with a natural bend defined in combination with the backing layers' elasticity to eliminate massive support plates and assist the adhesive bonding;

providing proton insulation between adjacent and electrically linked in plane cell elements by interrupting potential proton flow along the central membrane. Interruption is provided by insulation structures of adhesive, laminate and/or photo-sensitive material.

A fuel cell is provided comprising two electrodes and an electrolyte layer interposed between the two electrodes. The fuel cell also comprises one or more backing layers in contact with the electrodes. At least one of the fuel cell has a boundary structure made of radiation curing resin that is geometrically defined by a radiation-sensitive image transfer method such as, for example, selective patterning. The curing irradiation may be UV-light or a proton beam.

In a first aspect of the invention a backing layer of fuel cell is provided with fluid conductance system that may include up to several layers of independently shaped in plane and/or cross plane vacant passages, eventual integral flow restrictions, and/or eventual valve mechanisms at least partially formed by boundary structures. The boundary structures are preferably made by depositing and shaping of irradiation curing resin in eventual combination with etching, electroplating, sputtering, electrodeposition, printed circuit board (PCB) fabrication techniques or any other well known fabrication technique for micro scale and macro scale structural elements.

The one or more backing layers preferably contain prescribed high electrical-conductivity regions and prescribed low electrical-conductivity regions. In one embodiment, the high and low electrical-conductivity regions are preferably defined by a selective deposition process wherein a broadly conductive layer is selectively deposited through unobstructed regions of a mask. Alternatively, the high and low electrical-conductivity regions are preferably defined by a selective etch process wherein the broadly conductive layer is selectively etched through exposed regions of a mask in contact with the conductive layer.

Across the assembly direction of the fuel cell's layers, ports or through holes may be fabricated as well. Such ports may be utilized for fluid conductance between individual functional layers. The high-electrical-conductivity regions may extend along the side walls of such ports in a fashion well-known for PCB vias. The through hole via connections may also be positioned in close proximity to, or direct contact with, the electrodes. The high electrical conductivity regions are preferably in contact with other components of the fuel cell without requiring external mechanical compression. The contact is preferably electrical contact. The high electrical conductivity regions preferably form a continuous electrically conductive path through the bulk of a material having substantially lower electrical conductivity, thereby providing a prescribed path of electrical conductance. The central membrane may also be selectively deactivated and/or structurally altered in regions between adjacent cell elements by prescribed mechanical, thermal, chemical, or electrical degradations and/or alterations, such that ion conductivity between individual cell elements is substantially inhibited within the fuel cell assembly.

A number of individual fuel cell elements may be in plane assembled and electrically connected within the fuel cell assembly. The electrical connections may be parallel and/or serial and reconfigurable by suitable insertion or removal of electrically conductive junction elements such as, for example, jumpers, switches, and solder joints.

Preferably, the fuel cell's layers are held together without substantial compressive force externally applied. No mechanical clamping elements are part of the fuel cell assembly. Individual layers are held together by adhesive bonding. During the bonding process, the bonded layers are temporarily compressed across the areas of applied adhesive. Once the adhesive has cured, the temporary compressive force is released and substituted to a certain extend by a resilient tensile force between the adhesively bonded areas. To evenly distribute the tensile force across areas without direct adhesive bonding, the backing layers may be prefabricated with a predefined curvature that corresponds somewhat with a dome. The dome may be shaped in conjunction with the backing layers natural resilience such that it provides a substantially even compression onto the adjacent planar layer once bonded to that adjacent layer.

Adhesive substance may be used for bonding purposes and/or for locally increasing conductivity between layers, for example, to make current collectors or electrical interconnections between cell elements. The adhesive may be composed of an inorganic material, and may also form a hermetic seal around prescribed cavities.

A method of producing a fuel cell is includes preparing a semi-rigid polyimide substrate with patterned through-holes for reactant gas ports and electrical interconnections. A photo-sensitive epoxy resin (e.g., MicroChem SU-8) is coated on the polyimide substrate, and is subsequently patterned with reactant flow channels by photolithography through a predefined mask. The surface of the epoxy structures is optionally coated by a conductive film. A photo-chemically etched metal foil is then laminated onto the flow channels, where the etched openings in the metal foils are small, preferably on the order of 10 microns. The fine feature size serves dual purposes as a structural support to hold the catalyst material in place, and as a fine electrically conductive grid to conduct current with low resistance. A membrane-electrode assembly having a carbon-supported platinum catalyst layer dispose on each side is then bonded between symmetric constructions of the metal foil plus photo-patterned channels plus polyimide backing.

In a second aspect of the invention a fuel cell assembly including a fiber-reinforced adhesive to bond fuel cell components is introduced. In addition to facilitate bonding of fuel cell components, the fiber-reinforced adhesive also serves to seal and isolate reactants in the chemical reaction means of the fuel cell. The fiber-reinforced adhesive is typically compliant in nature, compatible with the membrane electrolyte and includes an adhesive as well as a network of fibers. A membrane electrolyte is bonded to backing layers using the fiber-reinforced adhesive. The backing layers are bonded by the adhesive properties of the fiber-reinforced adhesive. The electrolyte is bonded by the adhesive properties of the fiber-reinforced adhesive as well as this bond is strengthened by penetration of the fibers of the fiber-reinforced adhesive into the electrolyte.

The assembly of fuel cell components using a fiber-reinforced adhesive occurs under elevated temperature and under elevated pressure. The fiber-reinforced adhesive could come in a one or more patterned sheet or in a free-flow form. The bonding of two or more fuel cell components could occur simultaneously and in an automated fashion.

The ultimate fuel cell assembly of the present invention does not require external compression during operation since the mechanical bond and strength to keep together the fuel cell assembly during operation is now provided by the bonding characteristics and strength of the fiber-reinforced adhesive.

The introduction of fiber reinforcement in the fiber-reinforced adhesive provides a more reliable bonding compared to pure adhesives. Particularly, the use of fiber-reinforced adhesive additionally supports a compact and lightweight packaging that is enabled by the use of inherently thin manufacturing materials, and especially by eliminating the need for conventional load-bearing components such as threaded bolts and rigid compression plates. Automated fabrication to assemble the fuel cell of the present invention is favored by the use of highly scalable manufacturing processes including continuous compression plates. Design flexibility and complexity of the fuel cell assembly are enabled by the fact that the fiber-reinforced adhesive is patternable into intrinsic patterns. Also, increased durability of the fuel cell assembly is provided by the compliant nature of fiber-reinforced adhesive. The assembly in effect becomes an engineered laminate composite and can thereby be optimized in terms of stiffness, toughness and other mechanical properties. Lower cost is provided by the choice of batch-process materials and non-manual assembly sequences.

In a third aspect of the invention a new design concept is described for reactant flow distribution in a fuel cell, in such a way as to promote uniform pressure and velocity, minimize fluid dynamic losses, and boost high cell performance. Small flow paths are arranged in a prescribed manner to deliberately control flow characteristics at each electrode site. The local channels control the degree of active (forced volume displacement) and passive (diffusion-driven) flow. Larger channels interface with the small channels, such that pressure loss is minimized and velocity uniformity is maintained. Following new features are provided: enabling of exceptionally small, massively parallel micro-channels for fuel cells, without suffering high pressure loss; broad-area uniformity by using interdigitated or otherwise alternating chambers for supply and exhaust; and methods of scalable, automated, low-cost manufacturing. The new features provide the following advantages over the prior art:

Uniform pressure and flow are achieved because the gross distribution of reactant is made in large channels to completely span the active cell area, and smaller channels having high resistance exist only very locally with short travel length.

Reduced pressure loss is accomplished because the smaller precise channels are highly parallel and represent only a small fraction of the overall travel length from supply to exhaust.

Performance optimization can be controlled to an exceptionally fine degree because the flow behavior is locally controlled on a sub-millimeter scale, avoiding broad-area non-uniformity.

Compact and lightweight packaging is enabled by the use of inherently thin manufacturing materials.

Automated fabrication is favored by the use of highly scalable manufacturing processes including photo-patterning, and continuous film or batch sheet processing.

Lower cost is provided by the choice of batch-process materials and non-manual assembly sequences.

DETAILED DESCRIPTION

Figure 1:
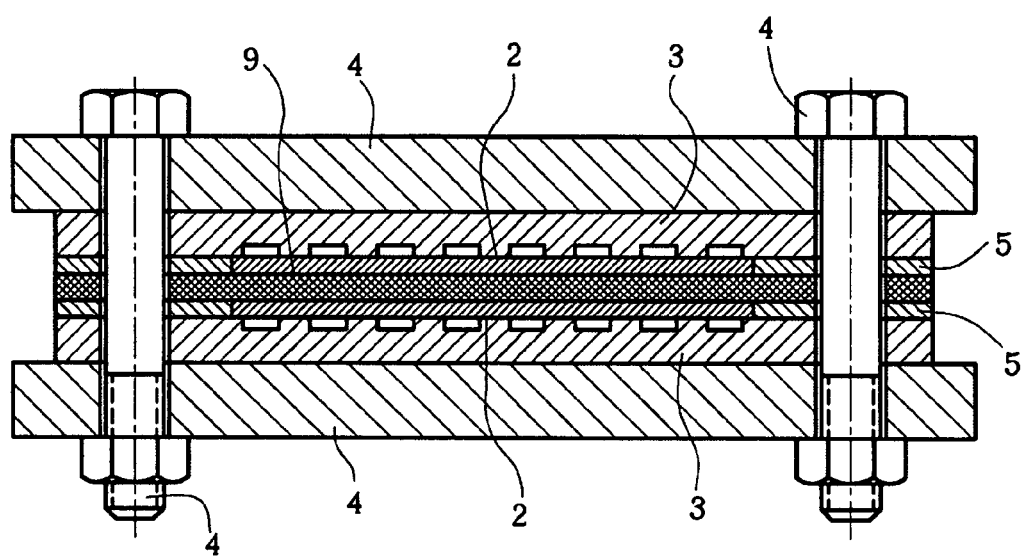
FIG. 1 shows a simplified cross section of a prior art fuel cell.
Figure 2:
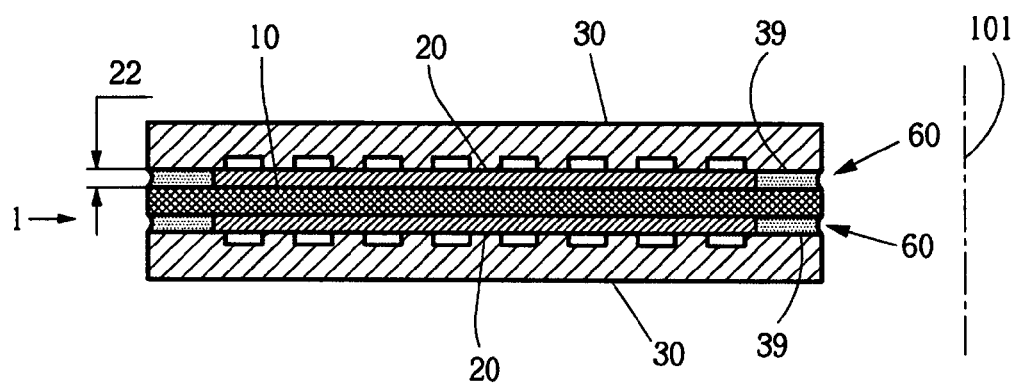
FIG. 2 depicts a simplified cross section of a fuel cell according to an objective of the present invention.

In the present invention novel design configurations and fabrication methods for compact fuel cells with high power density are described. Referring to FIG. 2, a basic fuel cell device 1 in accordance with the present invention includes an ion-conducting electrolyte membrane 10 between two electrodes 20, backed by backing layers or backing structures 30. The backing structures feature flow distribution channels 31, 32, 35, 36, 37, 38 (see FIGS. 3-11) for fluid supply and fluid exhaust. A catalyst on one electrode promotes separation of ions and electrons at the fuel side. Only the ions conduct through the electrolyte, and recombine with electrons at the oxidant side. The electrons are conducted through an external circuit, thus supplying electrical power. The layers of the fuel cell 1 are assembled along the assembly axis 101.

For ease of the invention the numerous aspects of the invention are initially described in separate chapters. Cross dependency of the individual aspects after the separate description of the numerous aspects.

Boundary Structures Made of Photo-Sensitive Material

In a first embodiment, a boundary structure for defining a vacant passage for fluid conductance is fabricated from a photo-sensitive material, such as a UV-curing epoxy resin. The fabrication of the boundary structure is accomplished by use of a substrate on which the photo-sensitive material is deposited in an uncured fashion. Photo-sensitive materials are commonly used for fabrication of sacrificial patterns used for example for etching structures. Dependent on the stiffness and strength requirements within the fuel cell assembly, the substrate may be, for example a semi-rigid polyimide or a fiber-reinforced epoxy. The substrate may be permanent or sacrificial.

Typical characteristics of a photo-sensitive material relevant for fabrication of boundary structures in a fuel cell include smallest possible feature size, feature aspect ratio, and a number of physical properties. Physical properties include gas impermeability, curing shrinkage, thermal expansion, thermal conductivity, thermal resistance, elasticity, chemical fuel cell fluid resistance, and adhesive strength. A preferred material complying to the relevant characteristics is an epoxy resin commercially available under the trade name MicroChem SU-8. The making of a boundary structure is performed in several steps that are similar to that of making a sacrificial pattern. Initially, the uncured photo-sensitive material is deposited on a substrate. It may be backed to reduce the uncured material' viscosity such that the deposited material remains substantially immovable during consecutive fabrication steps. In that fashion the deposition process may be repeated to increase the total deposition height beyond the level of a single deposition process. The photo-sensitive material may be also deposited in form of a well-known prepreg.

Depending on the photo-sensitive material's curing characteristic, a maximum contour height of a single contour level may be fabricated during a following selective patterning combined with a irradiation curing. The curing characteristic of MicroChem SU-8 for example provides for a conventional UV-irradiation a minimum feature resolution on the order of 1 micron and a minimum feature size for structural elements on the order of 10 micron for a curing height between 10 microns and 1 millimeter. Greater than 10:1 aspect ratio may be achieved, meaning that if a feature size of 10 microns is desired, a contour level fabricated in a single irradiation curing may have a maximum height of greater than 100 microns.

Contour height of contour level fabricated without consecutive material removing operations is mainly defined by the deposition process during which the uncured photo-sensitive material is deposited with a certain height. Manufacturers of photo-sensitive materials typically provide detailed information about procedures for uncured material depositions with predefined deposition heights.

In context of the present invention a contour level is that level of a boundary structure at which side walls of the boundary structure are substantially continuous and propagating somewhat in direction of deposition height. Dependent upon the irradiation source's orientation and focus, sidewalls may converge, diverge or propagate perpendicular to the deposition direction of the boundary structure.

The use of a photo-sensitive material in combination with selective patterning and irradiation curing provides also for feasible mass production of non planar boundary structures. In such cases the photo-sensitive material may be deposited either on a non planar substrate or a planar substrate. A three dimensional curvature may be fabricated either by depositing it on a curved substrate and/or by baking the deposited photo-sensitive material in a curvature mold. Also, secondary machining operations may be applied to the baked but uncured resin to fabricate a three dimensional curvature. This advantage will become more apparent in the below chapter of "Natural Bent Backing Layers"

At the time this invention was made, UV-irradiation for curing photo-sensitive materials is known to the inventors as substantially depth insensitive. This means for the fabrication of a contour height of a contour level, that after each irradiation step the uncured material needs to be removed to prevent inadvertent curing during the irradiation curing of a consecutively deposited layer.

To the knowledge of the inventors, UV-curable resin such as MicroChem SU-8 may also be cured by proton irradiation with the particular advantage of adjusting a curing depth by modulating proton irradiation parameters. In that way deposition, and selective patterning may be performed in a repetitive fashion without need of intermediate removal of uncured photo-sensitive material. The uncured material remaining after the selective patterning and irradiation curing may be utilized as a sacrificial substrate in a consecutive fabrication cycle of depositing, selectively patterning and irradiation curing. This serial patterning is highly advantageous in fabricating intricately shaped layers with a number of overlapping and/or covering contour levels fabricated on top of each other. All uncured residual material remaining after the serial patterning is removed during a final simultaneous development of the number of previously proton-irradiated levels. In context with the present invention, a shaped layer is a layer of a fuel cell assembly made from photo-sensitive material with selective patterning and irradiation curing.

For the reasons stated above, the use of a photo-sensitive material is highly attractive for making boundary structures in a fuel cell. Other techniques such as sputtering and/or electroplating may be utilized for fabricating conductive leads and/or conductive regions in combination with photo-sensitive materials.

The photo-sensitive material may be used for fabricating bottom, side-wall and/or top portion of a vacant passage and other structural elements such as valves, flow regulators or electro-mechanical elements. Photo-sensitive materials with varying properties may be combined for specific purposes as is well appreciated by anyone skilled in the art. Other structures, like for example a proton insulation structure may be fabricated from photo-sensitive material as described above. The use of a proton insulation structure is described under the below chapter "Proton Cross Conductivity Avoidance".

Yet in some instances it is necessary to include other fabrication technique to include and/or integrate functional elements such as conductive leads, paths, and areas or to provide other physical properties not obtainable with photo-sensitive materials. Particularly, fiber-reinforcement is impractical for irradiation curing of features that have similar dimensional scale as the fiber width, since the fibers introduce a disturbance to the irradiation propagating through the deposited material during the curing step.

PCB Fabrication Techniques for Conductive Paths Combined With Boundary Structures Another way of fabricating a shaped layer having multiple contour levels is by laminating and bonding a number of independently fabricated contour levels and/or shaped layers. Moreover, any board like structure may be laminated and integrated as long as it fits sufficiently for bonding purposes. Specifically for building a more massive board structure with larger scale features compared to those made with photo-sensitive materials, lamination and other fabrication techniques well-known for printed circuit board (PCB) are introduced in combination with photo-sensitive materials. The board structure may be fabricated from a number of laminated prepregs. Fiber-reinforced epoxy may be used to provide stiff structures that may span across extended areas with only minimal deflection.

The board structure may be utilized as a substrate for fabricating contour levels, shaped layers, and/or boundary structures from photo-sensitive material as explained in the chapter above. The board structure in itself may also feature boundary structures for example, for supply channel manifolds 31, 35, 37 and/or exhaust channel manifolds 32, 36, 38 as is described in the below.

The board structure is preferably fabricated in a dimensional scale similar to that of well-known PCB. Hence, inexpensive and readily available PCB fabrication techniques may be utilized to fabricate electrical components suitable for collecting and/or transmitting current that occurs at the diffusion layer during the fuel cell's operation. Of particular interest are via holes usually employed in PCB for soldering electronic components to the PCB and for providing conductive paths from one side of the PCB to the other side or to/within metallic layers within the PCB. Such via holes are usually through holes fabricated with varying hole diameters and featuring metal coated sidewalls. In the present invention, via holes are utilized for fluid conductance together or alternating with collected current transmission. This is particularly advantageous for configurations in which a large number of tightly arranged via holes are employed for efficient fluid conductance with simultaneous current transmission across the board structure's height.

Another technique employed in the present invention is a well-known PCB fabrication technique for shaping metallic cladding layers present at one or both sides of the PCB as well as within the PCB. In that way, boundary structures of vacant passages as well as conductive leads or path may be fabricated. In the particularly relevant case of fabricating sidewalls of vacant passages adjacent a gas diffusion layer 20, the highly conductive properties of the cladding layer are advantageous in transmitting the collected current away from the gas diffusion layer. PCB like board structures have a range in thickness between 50 microns and 1 millimeter. PCB like cladding layers utilized for boundary structures range in thickness between 10 microns and 200 microns. Metals of cladding layers may be copper, which is relatively easy to pattern and etch. Additional corrosion resistance against the fuel cell's operational fluids, the cladding layer may be coated with metallic corrosion resistant layer such as gold. Besides the cladding layer other techniques such as sputtering and/or electroplating may be utilized for fabricating conductive leads and/or conductive regions.

To utilize conductive via holes and/or cladding layers for boundary structures with high electrical conductivity and to accommodate for thickness limitations particularly of cladding layers on commercially available PCB raw material, special channel designs such as the micro-channel architecture and the micro-stitch architecture are embodied in the present invention.

Micro-Channel Architecture

Figure 3:
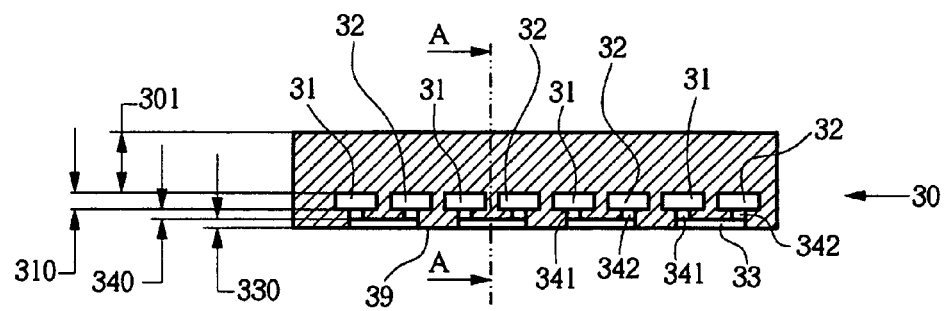
FIG. 3 shows a first exemplary cross section of a simplified backing layer configured with micro-channels.
Figure 4:
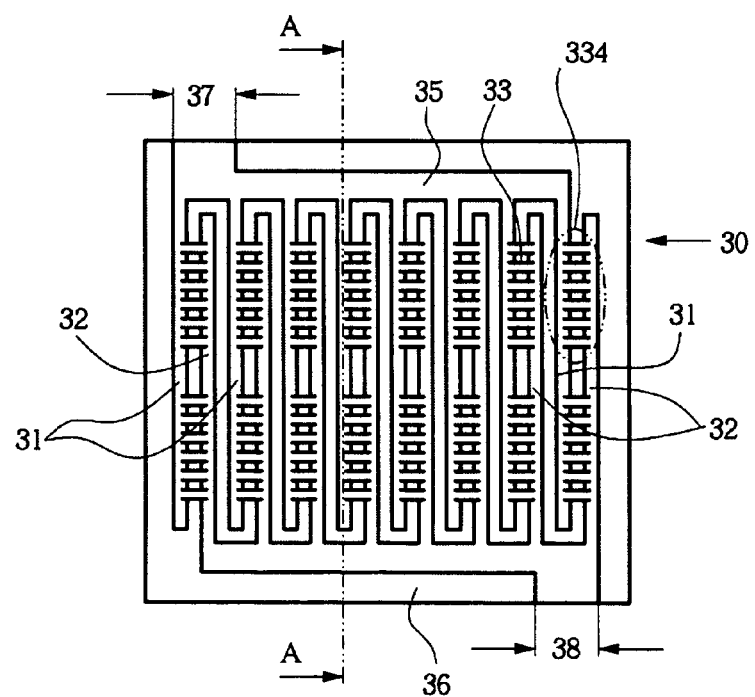
FIG. 4 is a bottom to top view of an exemplary backing layer similar to that depicted in FIG. 3.

According to FIGS. 3 and 4 a backing layer 30 provides vacant passages in the configuration of massively parallel micro channels 33 arrayed on a contacting face 39 of the backing layer 30. The feature size of the micro channels 33 is preferably between 20 microns and 400 microns. Minimum channel size is influenced by the structural configuration of the adjacent and contacting gas diffusion layer 20. For a diffusion layer 20 that includes carbon cloth, the carbon fibers have a thickness of about 10 microns. Reducing the channel width below the fibers thickness bears the risk of clogging the top of the micro channels 33 and inhibiting the fluid propagation between the diffusion layer 20 and the micro channels.

The relatively small cross sections of the micro channels 33 are compensated by a massively parallel arrangement of them. Fluid is conducted into and out of the micro channels 33 through first openings 341 and second openings 342. The first openings 341 are vacant passages connecting finger channels 31 of a supply channel manifold with the micro channels 33. The supply channel manifold includes a manifold inlet 37 and a supply cross channel 35. Fluid entering the fuel cell 1 through the manifold inlet 37 propagates along the supply cross channel 35 and is gradually distributed into the supply finger channels 31. The fluid propagating along the supply finger channels 31 is gradually distributed via the inlet openings 341 into the micro channels 33. Manifold inlet 37, supply cross channel 35 and supply finger channels 31 are part of the supply channel manifold.

Residual fluid exits the micro channels 33 through outlet openings 342 into exhaust finger channels 32 which direct the residual fluid into an exhaust cross channel 36. All residual fluid collected from the individual exhaust finger channels 32 propagates towards the manifold outlet 38 where it exists the fuel cell 1. Manifold outlet 38, exhaust cross channel 36 and exhaust finger channels 32 are part of the exhaust channel manifold.

The combination of interdigitated supply finger channels 31 and exhaust finger channels 32 in combination with the cross oriented micro channels 33 provides for a highly effective utilization of the fuel cell's 1 foot print for fuel cell elements. The area extension of a micro channel field 334 is preferably defined in conjunction with the area requirement of single cell element for a given power output of that cell element. In context with the present invention, a micro channel field 334 may be an substantially continuous array of micro channels 33. Separation between micro channel fields 334 is defined by proton insulation requirements between electrically linked cell elements as is described in more detail in the below chapter "Cross Conductivity Avoidance". Separation between micro channel fields 334 is also defined for adhesive bonding areas as described in more detail in the below chapter "Adhesive Bonding". Separation between micro channel fields 334 is further defined for current transmission as described in more detail in the below chapter "Current transmission".

It is desirable to arrange finger channels 31, 32 and micro channels 33 such that the openings 341, 342 may be at a maximum for a given with of the micro channels 33 and the finger channels 31, 32. For that purpose, the micro channels 33 may overlap the finger channels 31, 32 to the extent that each opening 341, 342 may extend over the entire width of the finger channels 31, 32 and still being within the boundaries of the corresponding micro channel 33. The openings 341, 341 may be at the end of the micro channels 33, which means in context with the invention a position with respect to the finite length of the micro channels 33 such that externally forced fluid exchange as well as well-known reaction driven fluid exchange between the diffusion layer 20 and the micro channel 33 is substantially constant along the micro channel's 33 length.

The micro channels 33 form together with the openings 341, 342 and the channel manifolds an intricately shaped boundary structure, which may include shaped layers as well as board structures. Shaped layers and/or board structures may be implemented depending on the scale of the micro channels 33, the number of micro channel fields 334 and depending on other design criterions well appreciated by anyone skilled in the art. For example, where the micro channels 33 are at a scale compatible with PCB shaping techniques for cladding layers, a first board structure may be employed across the micro channel contour height 330. Micro channels 33 may be fabricated into the cladding layer. The openings 341, 342 may be via holes in the first board structure or part of a second board structure bonded to the first board structure. The channel manifolds with their manifold contour height 310 may be integrated within either the first, second or a third board structure bonded to the adjacent one. Applicable feature sizes of openings 341, 342 and micro channels 33 may be in the range of 20 microns and 400 microns.

In another example, where the micro channels 33 are at a scale compatible with forming techniques discussed in the above for photo-sensitive materials, a first shaped layer may be employed across the micro channel contour height 330. A first contour level defining the micro channels 33 across the contour height 330 may either be fabricated on a sacrificial substrate or on top of a board structure or a contour level providing the openings 341, 342. In case a board structure is employed across the contour height 340, the openings 341, 342 may again be fabricated as via holes. In case where the micro channels 33 are at a scale below dimensional PCB fabrication limits, a second contour level may be employed across the contour height 340. This example may be well continued by anyone skilled in the art to demonstrate any possible combination of PCB fabrication and photo-sensitive material for providing the boundary structures of all involved vacant passages in correspondence with dimensional scale and optimum mass production. Applicable feature sizes of openings 341, 342 and micro channels 33 for best use of photo-sensitive material may be in the range of 20 microns and 400 microns.

In the case, where solely photo-sensitive material is employed for making the boundary structure, a substrate may be provided across the backing height 301. In that case the substrate may be of semi-rigid polyimide or a fiber-reinforced epoxy.

Channel width and separation distance between individual micro channels 33 is preferably similar, to keep the contact pressure between the boundary structure and the diffusion layer within practical ranges. Also, a certain contact area between the boundary structure and the diffusion layer 20 is desirable for an improved current collection from the diffusion layer 20. More details are found in the chapter below "Current Collection".

Figure 17:
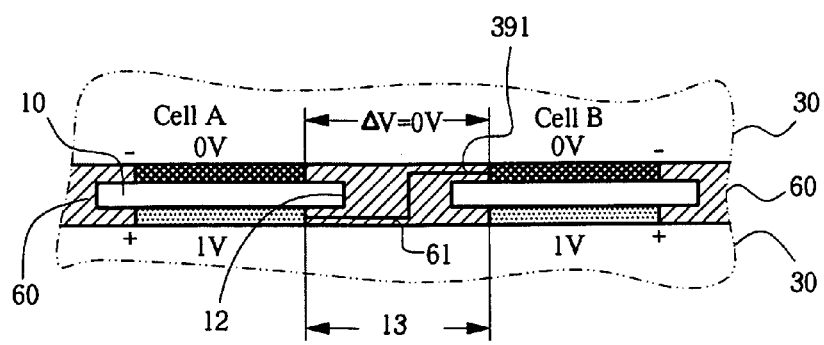
FIG. 17 is a schematic cross section of a membrane-electrolyte assembly corresponding to FIG. 16 with exemplary proton insulation structures.
Figure 18:
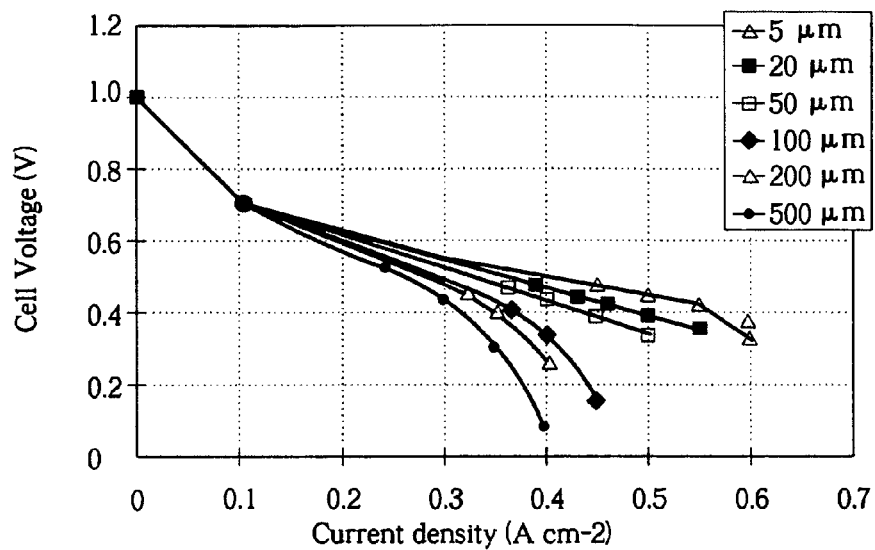
FIG. 18 shows an exemplary graph of cell voltage versus current density for various micro channel sizes.

For a substantially homogenously shaped micro channel field 334 in which features sizes such as channel width, channel height and channel spacing are substantially equal, a number of experimentally determined current densities for operational cell voltages are illustrated in FIG. 17. The various curves where measured for features sizes in the range between 5 and 500 microns. Surface roughness and other well-known influences where considered constant for the measurements. The results of FIG. 17 are presented in an inverted graph of FIG. 18, in which cell voltage is plotted over feature size. The curves in FIG. 18 are curves of constant current density.

Figure 19:
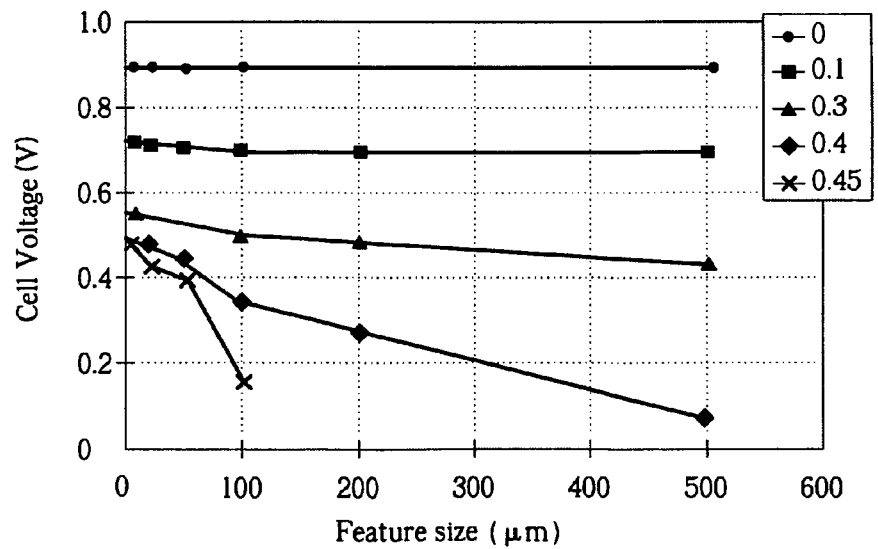
FIG. 19 shows an exemplary graph of cell voltage versus feature size for various levels of current density, illustrating that the voltage is higher for smaller feature size at any given current density.
Figure 20:
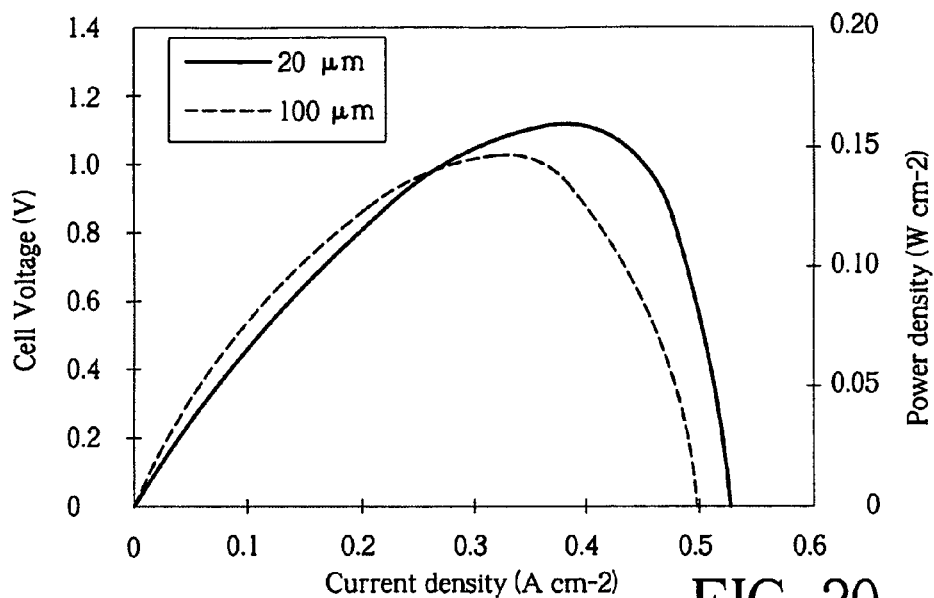
FIG. 20 shows an exemplary graph of power density versus current density for two micro channel sizes.
Figure 21:
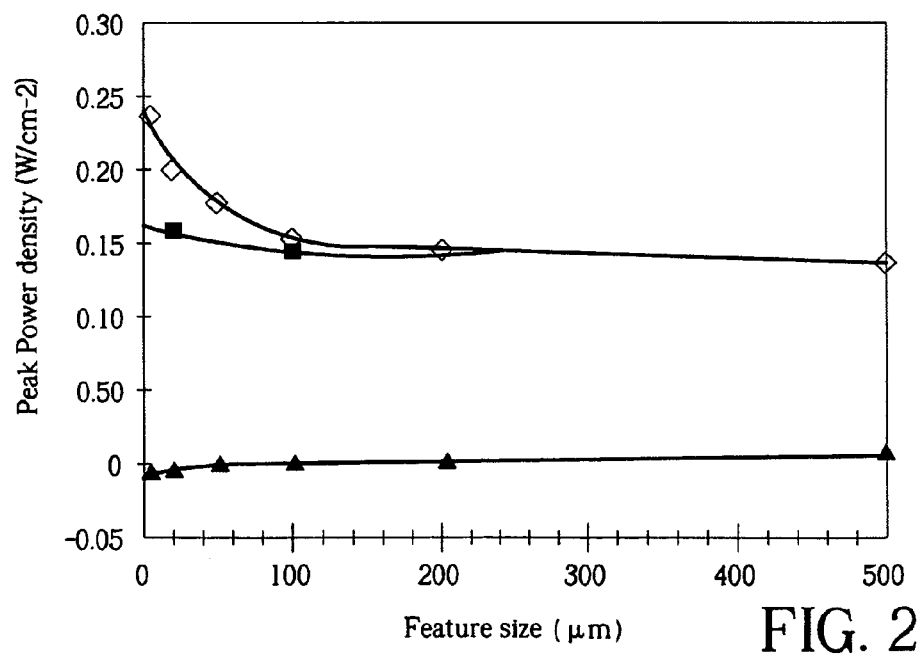
FIG. 21 shows an exemplary graph of peak power density and power loss versus feature size, and highlights on the upper curve that peak power is higher for smaller feature size, in contrast with a relatively smaller penalty from power loss associated with driving fluid through very narrow channels.

Under the same presumptions as described under FIG. 17, FIG. 19 shows power density over current density for 20 microns and 100 microns feature sizes. FIG. 20 again shows peak power density over feature size for varying current densities.

Current Collection

For efficient operation of the fuel cell 1, current is effectively collected at a collection interface between the contacting face 39 and the diffusion layers 20. Efficient current collection is accomplished in several ways and in accordance with the nature of the boundary structures adjacent the diffusion layers 20. In case of a board structure adjacent a diffusion layer 20, the contacting boundary structure may be of solid metal made from a cladding layer. Conductivity at the contacting face 39 is high.

Figure 5A:
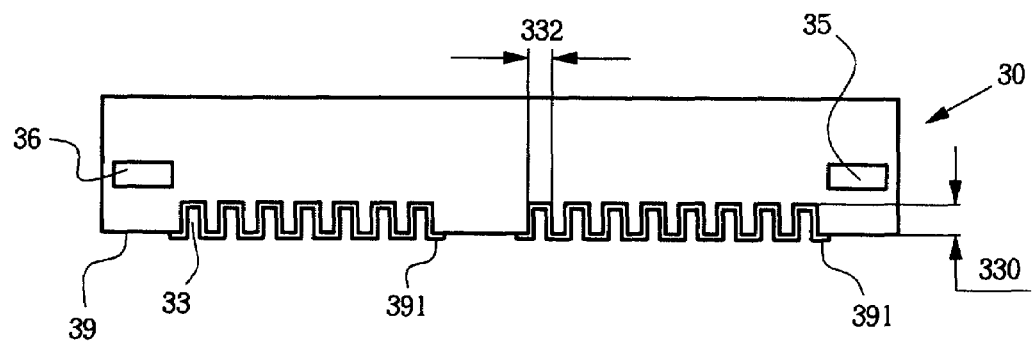
FIG. 5AA illustrates a first simplified section view indicated in FIGS. 3, 4 by section line A-A.

In case of photo-sensitive material being employed as a boundary structure the naturally low electrical conductivity of the resin at the contacting face 39 may be increased by conductively coating the contacting face 39 as shown in FIG. 5AA. The metallic coating 391 may be provided by electroplating and/or sputtering in combination with a selective patterning and/or consecutive etching such that the highly conductive regions remain confined within areas occupied by cell elements. Electrical cross conductivity between adjacent cell elements is prevented.

Figure 6A:
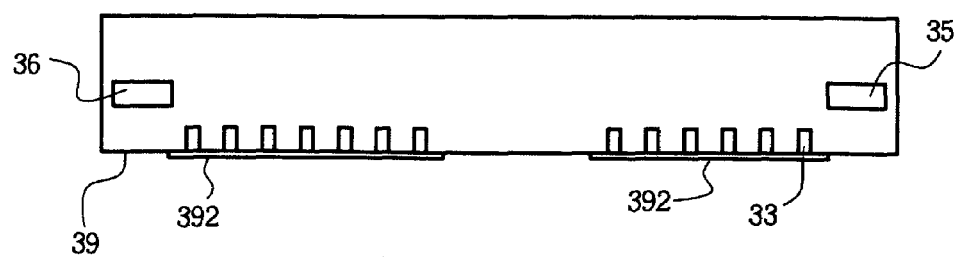
FIG. 6AA illustrates a second simplified section view indicated in FIGS. 3, 4 by section line A-A.

Electrical conductivity at the contacting face 39 may be also increased by bonding a prefabricated metal foil onto the contacting face 39 as is illustrated in FIG. 6AA. The metal foil is prefabricated with perforations to make the metal foil gas permeable such that fluid may conduct towards and away the diffusion layer.

Figure 22:
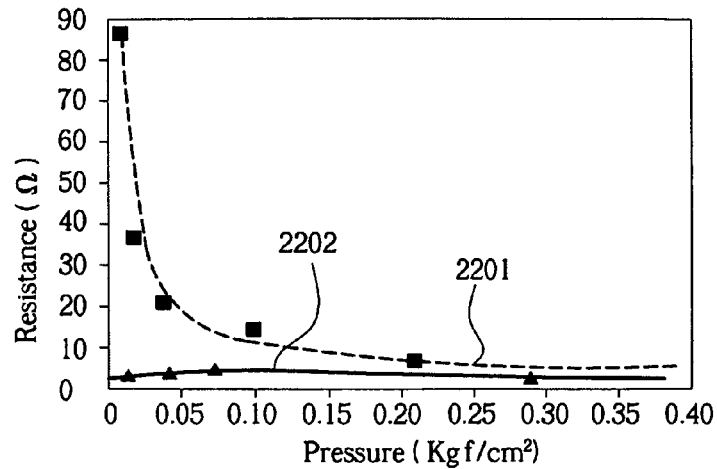
FIG. 22 shows an exemplary graph of current drain resistance versus inter layer pressure for the cases with and without Ag enriched resin bonding of the diffusion layer to the backing layer.
Figure 23:
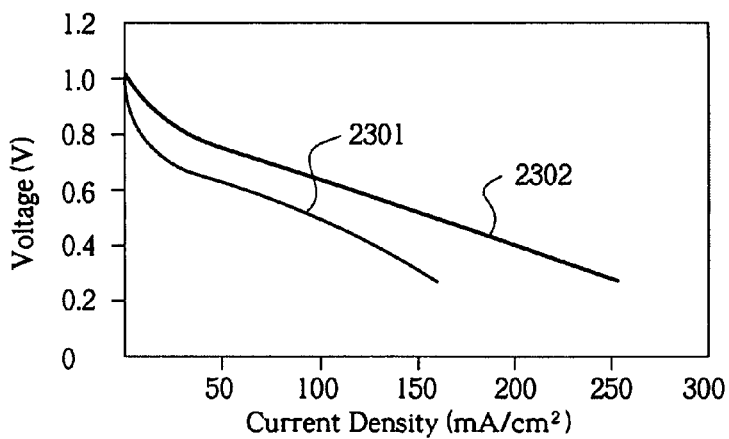
FIG. 23 shows an exemplary graph of cell element voltage versus current density for the cases of traditional compressed and uncompressed conductively bonded layer assembly.
Figure 24:
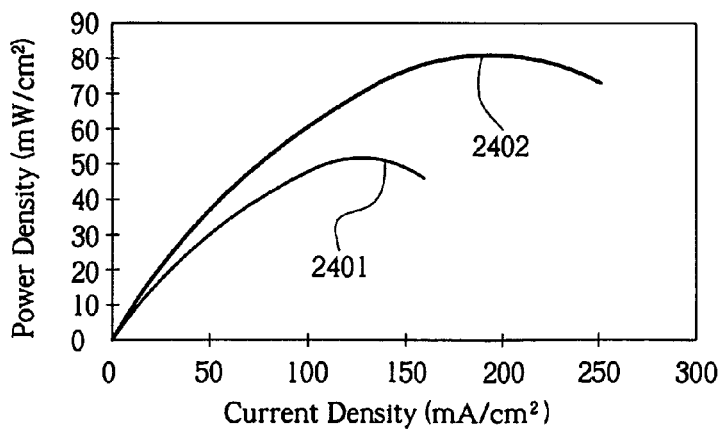
FIG. 24 shows an exemplary graph of power density versus current density for the cases of traditional compressed and uncompressed conductively bonded layer assembly.

In both cases of FIGS. 5AA and 6AA a conductive adhesive may additionally applied in the collection interface. Particularly for a fuel cell 1 without clamping mechanisms it is desirable to keep the contact resistance in the collection interface to a minimum regardless the contact pressure in the collection interface. FIG. 22 shows a graph of experimentally obtained contact resistance over contact pressure in the contacting interface. Curve 2201 shows the results for a blank contact interface without conductive adhesive. Curve 2202 shows the results for an improved contact interface with conductive adhesive. As a result of the reduced contact resistance current density and power density also increase as shown in FIGS. 23 and 24. In FIG. 23, curve 2301 is for the blank interface and curve 2302 is for the improved interface. In FIG. 24, curve 2401 is for the blank interface and curve 2402 is for the improved interface.

For the experiment the adhesive a silver-loaded epoxy with volume resistivity less than 0.001 Ohm-cm and lap shear greater than 1200 lb./in. Flowfields were etched in stainless steel foil having thickness nominally 50 microns and channel width approximately 100 microns. Flow channels were arranged as parallel rows over an active cell area of 14 mm×14 mm. Testing was conducted at room temperature and 1 atm pressure. The membrane-electrode assembly was a conventional Nafion 115 with platinum catalyst loaded at 2 milligrams per centimeter squared.

Current Transmission

For efficient operation of the fuel cell 1, current is effectively transmitted away from the collection interface in several ways and in accordance with the nature of the boundary structures adjacent the diffusion layers 20.

In case of a board structure adjacent a diffusion layer 20, the contacting boundary structure may be of solid metal made from a cladding layer. Conductivity across the contour height 330 is consequently high. Also, a conductive compound may be added to the board structure to increase electrical conductivity within the board structure.

In case of photo-sensitive material being employed as a boundary structure the naturally low electrical conductivity of the resin across the contour height 320 may be increased by conductively coating the side walls of the micro channels 33 as shown in FIG. 5AA. The coating may be provided in combination with a coating of the contacting interface as described in the chapter "Current Collection"

Figure 7:
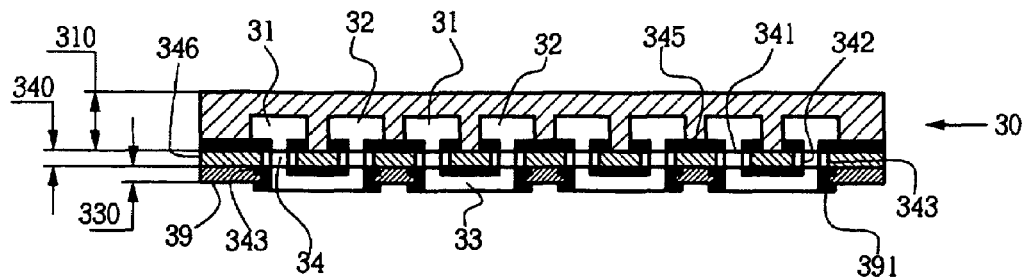
FIG. 7 shows a second exemplary cross section of a simplified backing layer configured with micro-channels.
Figure 8:
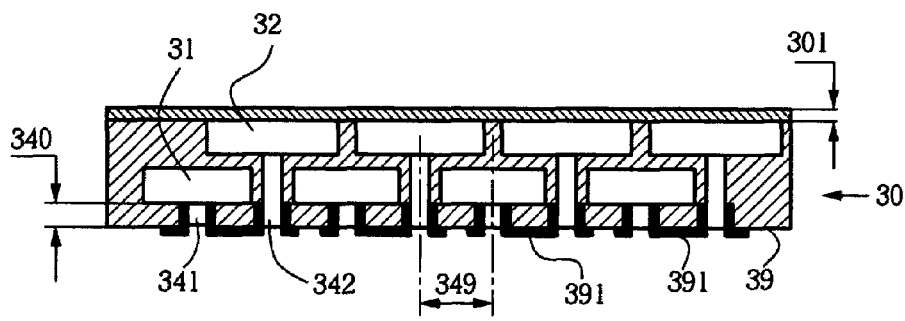
FIG. 8 shows a third exemplary cross section of a simplified backing layer configured with micro-stitch.
Figure 9:
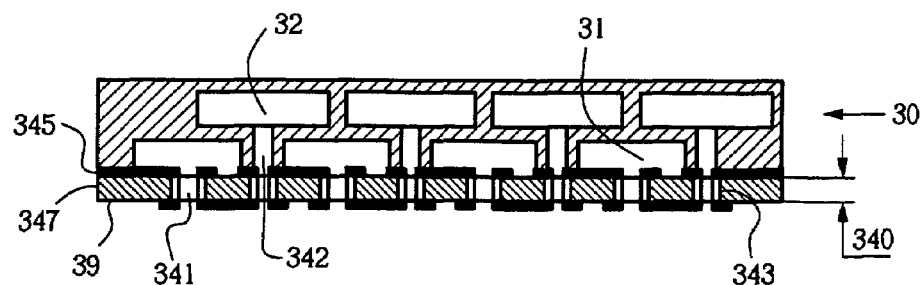
FIG. 9 shows a fourth exemplary cross section of a simplified backing layer configured with micro-stitch.

The current is preferably separately transmitted away from each cell element. For that purpose, conductive paths or leads are fabricated across and/or along the contour heights 330 and/or 340. FIGS. 7-9 illustrate exemplary cases of photo-sensitive materials and/or board structures in sole or combined use.

In FIG. 7, a board structure 346 is employed across height 340. The board structure 346 has via holes operating as inlet and outlet openings 341, 342. The via holes have conductive walls 343 conductively connected with bulk leads 345 at a level distant from the contacting face. In context with the present invention, the distant level is preferably the side away from contacting face 39. The bulk leads may be fabricated into cladding layers. On the same side as the bulk leads 345 are the channel manifolds 31, 32. The cross sections of the channel manifolds 31, 32 are at a scale such that the height of the bulk leads 345 has substantially no adverse effect on the fluid propagation. The bulk leads 345 may be tightly arranged for a low resistive conductance of current towards the fuel cell's 1 circumference. Across the contour height 330 micro channels 33 are provided by a shaped layer. The side walls and bottom of the micro channels 33 as well as the contacting interface are metal coated. The metal coat is conductively connected with the via walls such that the a conductive path is established from the contacting interface across heights 330, 340 and along the bulk leads 345.

In FIGS. 8 and 9, the backing layer 30 features a micro-stitch architecture further explained in the below chapter "Micro-Stitch architecture". In FIG. 8, the entire boundary structures may be provided by a shaped layer fabricated with a number of contour levels on top of a substrate present across the height 301. Conductive leads for transmitting the collected current towards the fuel cell's 1 circumference are deposited on the contacting face 39 together and in between the current collectors.

In FIG. 9, a board structure 347 provides the contacting face 39. The remaining of the backing layer 30 is provided by a shaped layer. Bulk leads 345 are at side away of the contacting face 39 similar as described under FIG. 7. Current collectors are deposited on the contacting face 39 directly on board structure 347. Current collectors are conductively connected with the bulk leads 345 via the conductive walls 343.

At the circumference of the fuel cell 1, electrical elements 392 (see FIG. 12) like, for example solder terminals, jumpers and the like may be employed to provide temporary and/or permanent linking connections to, from and/or between individual cell elements of the fuel cell 1.

Micro-Stitch Architecture

Figure 10:
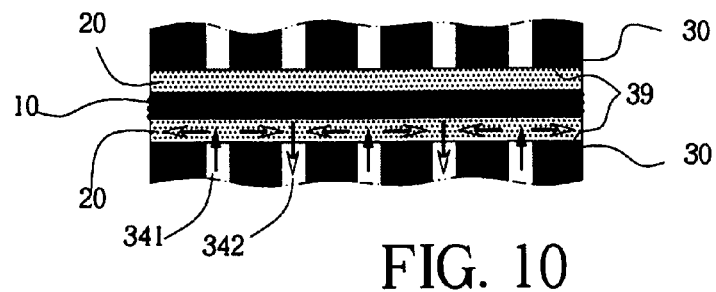
FIG. 10 shows a central cross section of a simplified fuel cell for illustrating the fluid flow for a micro-stitch backing layer.
Figure 11:
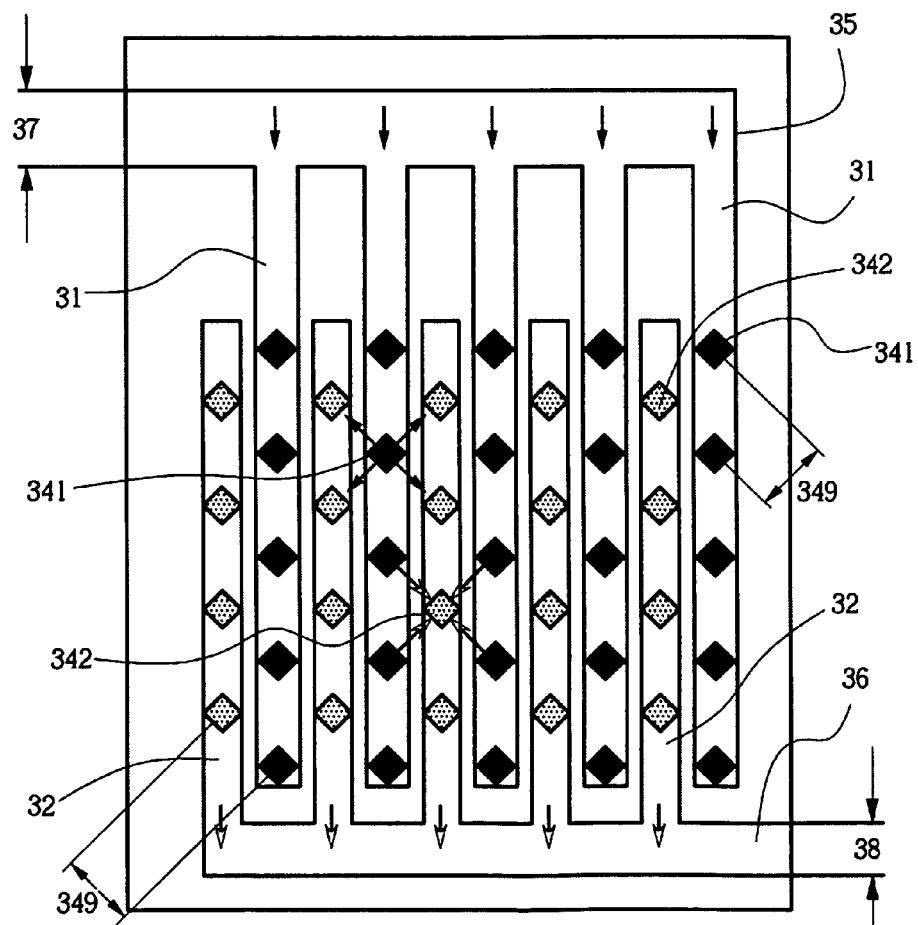
FIG. 11 shows a bottom to top view of a simplified backing layer for illustrating the fluid flow for the micro-stitch backing layer.

According to FIGS. 10 and 11, a micro-stitch architecture provides for a fluid flow through a diffusion layer 20 in regions between inlet holes 341 and outlet holes 342 adjacent the diffusion layer 20. The inlet holes 341 are arrayed with respect to the outlet holes 342 in an alternating and interlaced fashion and protrude towards the diffusion layer 20 through the contacting face 39. The fluid propagates in the vicinity of the inlet holes 341 through the diffusion layer 20 substantially radially away from the inlet holes 341 and in the vicinity of the outlet holes 342 the fluid propagates through the diffusion layer 20 substantially radially towards the outlet holes 342. As a result, dead zones of the diffusion layer 20 are substantially eliminated. A dead zone in the context of the present invention is a region of the diffusion layer where substantially no fluid reaches the electrolyte. Keeping the dead zones low contributes to a high all over current density along a cell element's diffusion layer.

The inlet holes 341 and outlet holes 342 communicate with their respective supply finger channels 31 and exhaust finger channels 32. A pitch 349 between the inlet holes 341 and the outlet holes 342 may be as low as 100 microns. The minimum size of the holes 341, 342 is limited by the features of the catalyst-loaded gas diffusion layer, to prevent blockage of the holes by either the carbon fibers or the catalyst powder. The two dimensional array of the inlet and outlet holes 341, 342 may be in angle to the protrusion direction of the finger channels 31, 32. In the case illustrated in FIG. 11, where the hole array angle is about 45 degrees with respect to the protrusion direction of the finger channels 31, 32, the width of the finger channels 31, 32 is at a minimum for a given pitch 349.

To provide the width of the finger channels 31, 32 more independently from the pitch 349, three dimensional manifold channel may be accomplished in combination with shaped layers and/or board layers as described in the below chapter "Spatial Manifold Arrangement".

Spatial Manifold Arrangement

The possibility to shape intricate boundary structures by either a shaped layer or a board structure has been described in the above chapters "Boundary Structures Made of Photo-Sensitive Materials" and "PCB Fabrication techniques for Conductive Paths Combined with Boundary Structures". These possibilities are combined are independently applied to provide the distribution channel system that includes supply channel manifolds and exhaust channel manifolds in two ways. Firstly and as explained in the chapters above, supply channel manifold and exhaust channel manifold may be in plane and eventually defined within a single contour level of a shaped layer.

Secondly and as is illustrated in FIGS. 8 and 9, supply channel manifold and exhaust channel manifold are offset along the assembly axis 101. Thus, supply channel manifold and exhaust channel manifold may be defined within separate contour levels of said shaped layer. In that way, the width of the finger channels 31, 32 may be more generously selected. The length of the holes 341, 342 is accordingly adjusted to extend to the corresponding channel manifold.

The examples of FIGS. 8 and 9 exemplarily illustrate the inventive concept of utilizing several separated contour levels for fluid exchange towards and away from the gas diffusion layer. As it may be well appreciated by anyone skilled in the art, this concept may be modified to provide a fluid supply and/or fluid exhaust within separate contour levels as is feasible to fabricate and operate.

Adhesive Bonding

Intricate boundary structures and other functional layers of the fuel cell may be bonded together by adhesive. Photosensitive material may be specifically suitable for adhesive bonding when combined with chemically similar adhesives. For example, an epoxy based photo-sensitive material such as MicroChem SU-8 or a fiber-reinforced epoxy of a board structure may be well combined with an epoxy based adhesive. The similar chemical composition may provide well-known bonding advantages such as, for example, increased bonding strength, similar thermal properties, similar chemical properties and similar physical properties, which in summary make the bonding more reliable and easy to accomplish.

In addition, the use of an adhesive may reduce or eliminate separate parts such as, seals and insulators and clamping structures. Thus, an improved fuel cell 1 that utilizes adhesive bonding is more simple and inexpensive to fabricate, while providing a highly compact overall design and efficient operation.

Figure 12:
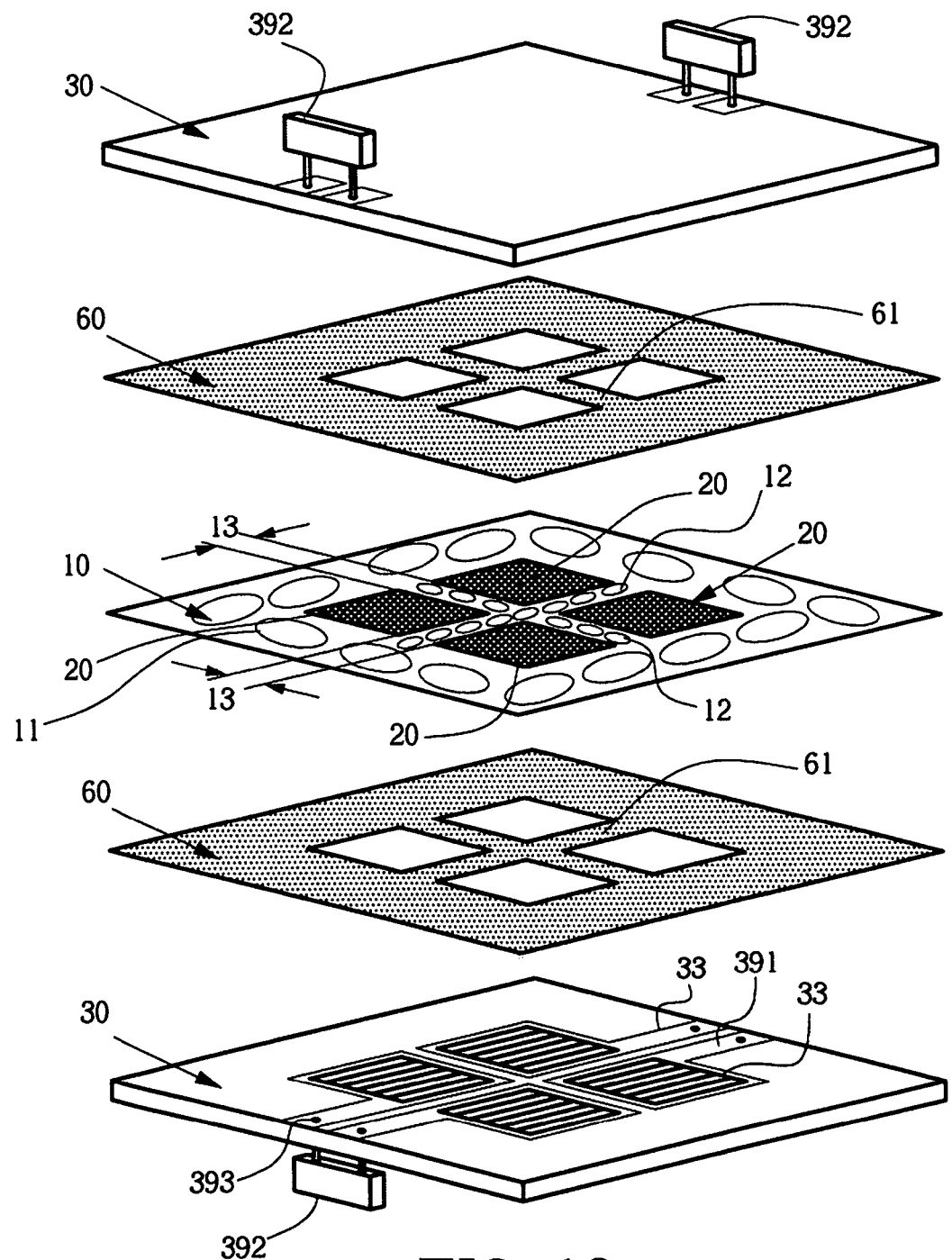
FIG. 12 depicts a perspective exploded view of an exemplary fuel cell assembly.

As is illustrated in FIG. 12, backing layers 30 may be adhesively bonded through material separations 11, 12 of the membrane 10. Material separations 11 provide additional function as explained in the below chapter "Proton Cross Conductivity Avoidance".

Fiber Reinforced Adhesive

The adhesive may be additionally fiber-reinforced for reason described in the following. FIG. 12 shows an exploded isometric view of the fuel cell assembly of the present invention, showing membrane electrolyte 10 having catalyst-loaded gas diffusion layer 20 on either major face. Membrane electrolyte 10 could for instance be duPont Nafion 115 that is prepared with electrode backing material such as carbon cloth with platinum catalyst interposed to form catalyst-loaded gas diffusion layer 20. However, as a person of average skill in the art would readily appreciate, the present invention is not limited to these types of materials since other electrolyte materials, electrode materials and catalysts could be also used without departing from the scope of the invention. In order to provide a region to seal and isolate the reactant chambers behind each catalyst-loaded gas diffusion layer 20, membrane electrolyte 10 itself extends to a region wider than the catalyst-loaded gas diffusion layer 20 common to the art of fuel cell design.

The exemplary embodiment of FIG. 12 further shows a patterned fiber-reinforced laminate adhesive sheet 60 on either side of membrane electrolyte 10, which bonds membrane electrolyte 10 to each of the backing layers 30 during assembly. The backing layers 30 are prepared with channels that are designed to distribute reactants to the outer face of catalyst-loaded gas diffusion layer 20. The backing layers 30 also have frame regions to provide sealing surfaces. Fiber-reinforced laminate adhesive sheet 60 is patterned by cutting an open region with surrounding frame to provide sealing around the perimeter while not obstructing the delivery of reactants to each gas diffusion electrode 20. The open region is sized to accommodate the electrodes without adhesive blockage and the frame is sized to match the sealing regions by the perimeter of the membrane electrolyte. The fiber reinforced adhesive 60 could be prepared in sheet form which promotes ease of automatic handling (such as batch processing) as well as it allows for complex geometric and intrinsic patterning. Fiber-reinforced laminate adhesive sheet 60 is preferably compliant by nature which increases durability of the fuel cell assembly, as well as it allows for optimization of stiffness, toughness and other mechanical properties of the bond. An example of the fiber reinforced adhesive sheet is the Isola FR400 series, e.g. FR402 pre-preg. However, other fiber adhesive agent could be used to achieve the objectives and advantages of the present invention to provide an adhesive as well as a fiber reinforced bond.

In an example of a fuel cell assembly, fiber-reinforced laminate adhesive sheet 60 is interposed between the electrolyte membrane 10 and each of two flow distribution backings 30. The entire assembly is subjected to elevated temperate and pressure sufficient enough to allow the fiber-reinforced adhesive to cure. Examples of elevated temperature and pressure are for instance, but not limited to, 120 degrees Celcius and 900 kPa, respectively. An example of curing time is for instance, but not limited to, about 2 hours at 120 degrees Celcius and 900 kPa. The bonding step further allows the fibers within the adhesive sheet to penetrate into membrane surface 10, thereby greatly enhancing intimate contact and mechanical interlocking (See FIG. 15). The full assembly retains in bonded condition after the temperature and pressure applications are removed.

Figure 14:
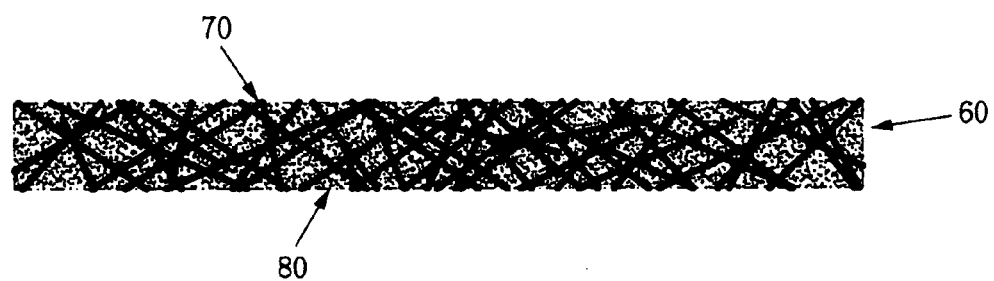
FIG. 14 shows a schematic cross section of a fiber-reinforced adhesive layer.

FIG. 14 is a magnified side view of a section of an exemplary embodiment of fiber-reinforced laminate adhesive sheet 60, which preferably includes a network of fibers 70 and an adhesive material 80. In a preferred embodiment of the present invention the adhesive is retained in the fiber matrix at room temperature, but liquid at elevated temperature as it would be applied during bonding.

Figure 15:
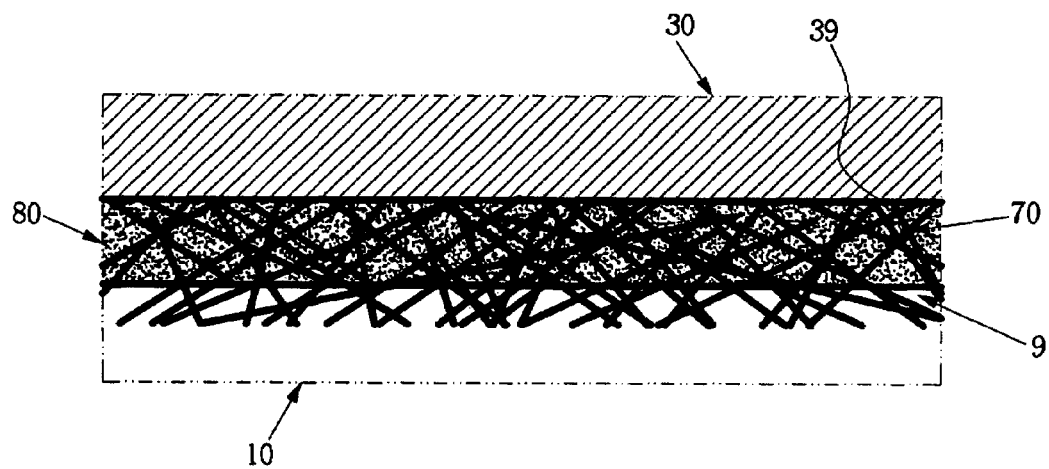
FIG. 15 shows a schematic cross section of two layers bonded with the fiber-reinforced layer.

FIG. 15 is a magnified cross-section side view of the fiber-reinforced laminate adhesive sheet, shown at the interface between an electrolyte membrane 10 and a flow distribution plate 30. The flowable adhesive 80 forms a surface bond with flow distribution plate 30. However, of particular note for the present invention is the interface region 90, in which fibers 70 penetrate into the main body of the membrane electrolyte 10. The penetrated fibers provides a mechanically enhanced bonding that is superior to surface adhesion alone. The fiber-reinforce bond between membrane electrolyte 10 and fiber-reinforced adhesive 60 accomplishes some deformation of a membrane electrolyte 10, which enhances the bond strength even more.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For instance, even though the present invention is described with regards to bonding between the membrane electrolyte and backing layers 30, other components of the fuels cell assembly or even multiple fuel cells could be assembled using a similar approach of using fiber-reinforced adhesive agents. Another variation is that the fiber-reinforced laminate adhesive sheet does not have to be supplied in a sheet form since it could also be supplied as a free-flow adhesive. The free-flow adhesive lends itself to alternative dispensing and patterning strategies, such as robotic manipulation of a syringe tip. Yet another variation of the present invention is to simultaneously bond the fiber-reinforced laminate adhesive sheet and the electrode/catalyst backing since both steps typically employ elevated temperature and pressure. For instance, a pre-assembled "hot-pressed" membrane-electrode assembly is followed by a separate step of adhesive bonding. However, in principle some or all of these treatments may be performed simultaneously. Still another variation is that the fiber-reinforced laminate adhesive agent could come as one or as multiple sheets that may be stacked to achieve tunable thickness and bond characteristics. Still another variation of the present invention is to alter or combine different integration process during fabrication of a fuel cell. For example, the fiber-reinforced adhesive agent may be patterned as an integral of the flow backing structure, rather than introduced as a separate sheet. It is also noted that patterning may include any manufacturing process that distinguishes discarded regions from the portions to remain in the final application. This set of processes includes but is not limited to stamping, blade cutting, laser cutting, photo-masking, and photo-developing. Still another variation of the present invention is that the method of assembling a fuel cell may be altered to achieve preferred characteristics. For example, in a preferred embodiment both the cathode side and the anode side of the membrane are bonded simultaneously. However, for purposes that may include special additives, seal inspection, humidity treatment, cleaning, etc. each side of the membrane may be bonded separately in any order. Still another variation of the present invention is that selective electrical conductivity may be employed by either incorporating or eliminating conductive filler material, such as silver powder or graphite fibers in the epoxy compound. All such variations are considered to be within the scope and spirit of the present invention.

Natural Bent Backing Layers

Figure 13:
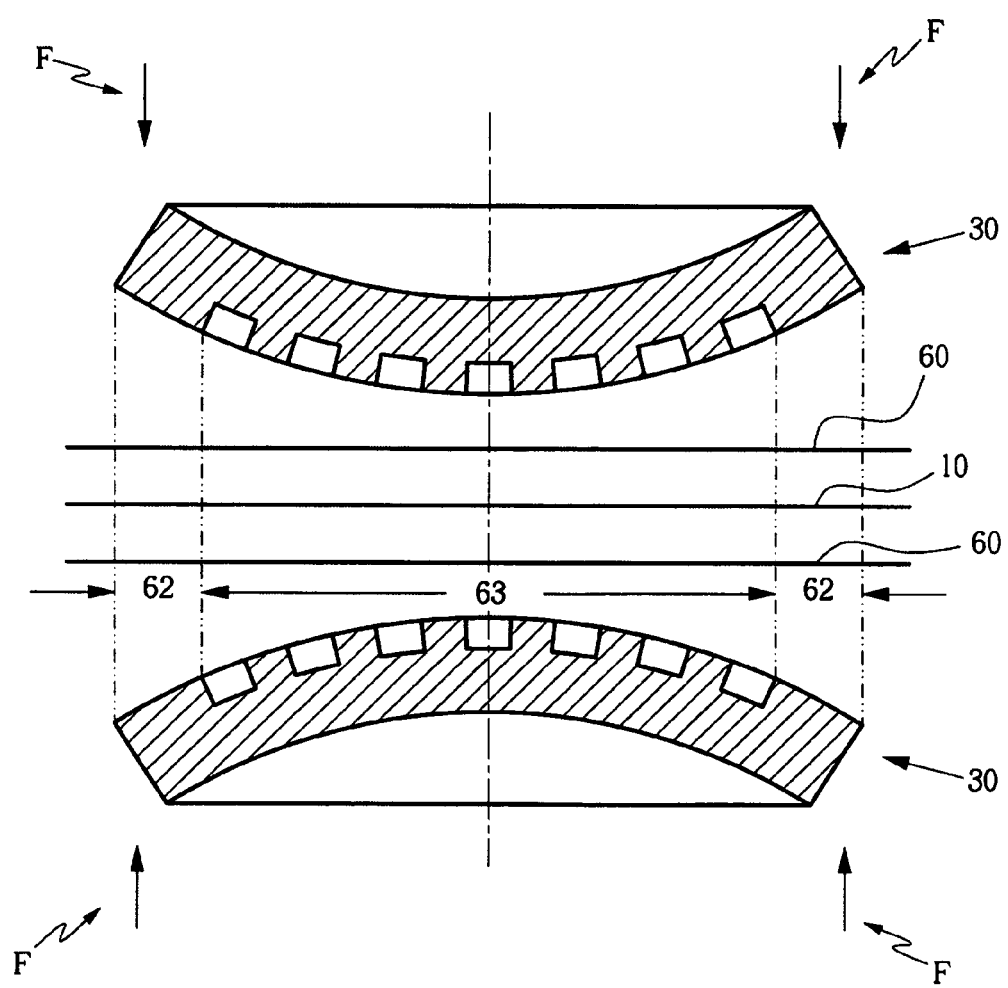
FIG. 13 illustrates a simplified section view of a fuel cell in pre assembly condition with the backing layers shown with a natural bend.

To keep the overall assembly height of a fuel cell 1 to a minimum, it is desirable to make and assemble the individual layers as thin as possible. At the same time, stiffness limitations of the used materials demand a certain minimal thickness where structural stiffness is mandated. Particularly and as it may be well appreciated by anyone skilled in the art, the backing layers 30 that back the central layers of the fuel cell 1 has to provide sufficient stiffness either during a pressure induced adhesive bonding operation and/or during operation of the fuel cell 1. To reduce the backing layers' 30 thickness, a natural bent may be introduced to the backing layers 30 such as to counteract the predetermined deformation of the backing layer 30. The predetermined deformation may occur during the bonding operation and/or during fuel cell operation As illustrated in FIG. 13, the backing layers 30 have a natural bent prior to their assembly. The natural bent is adjusted to forces F applied in the bonding areas 62. As a result, a contact pressure across the area 63 is substantially equal between the assembled backing layers 30, despite resilient deflection occurring in the consecutively assembled backing layers 30.

Proton Cross Conductivity Avoidance

Figure 16:
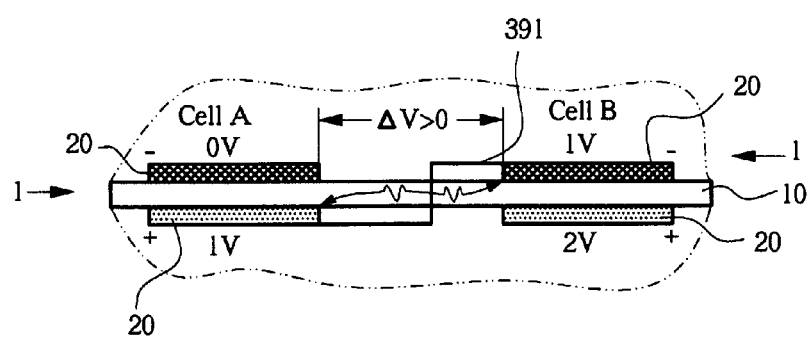
FIG. 16 illustrates the effect of proton cross conductivity by showing a schematic cross section of a membrane-electrolyte assembly with two adjacent and electrically linked in-plane cell elements.
Figure 25:
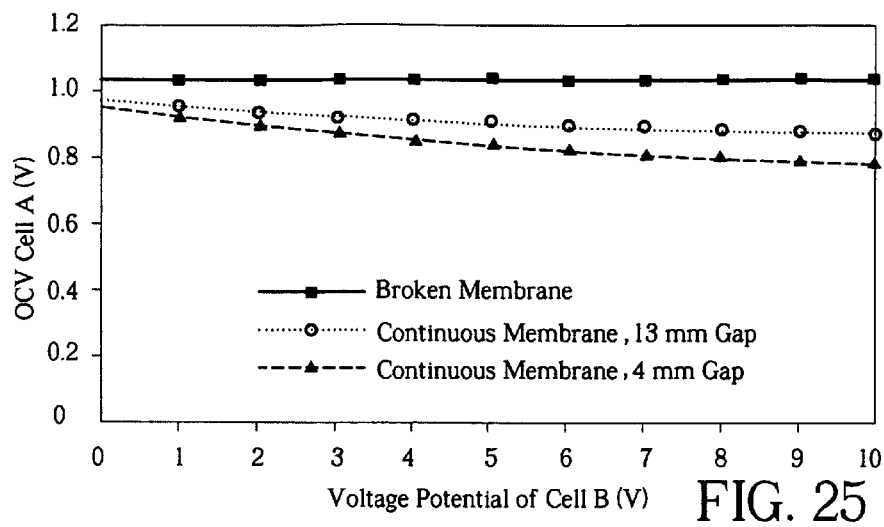
FIG. 25 shows an exemplary graph of operational voltage for a first cell versus the voltage potential of an adjacent second cell. The graph lines illustrate the relation between the two adjacent cells for varying proton insulation conditions between the two of them.
Figure 26:
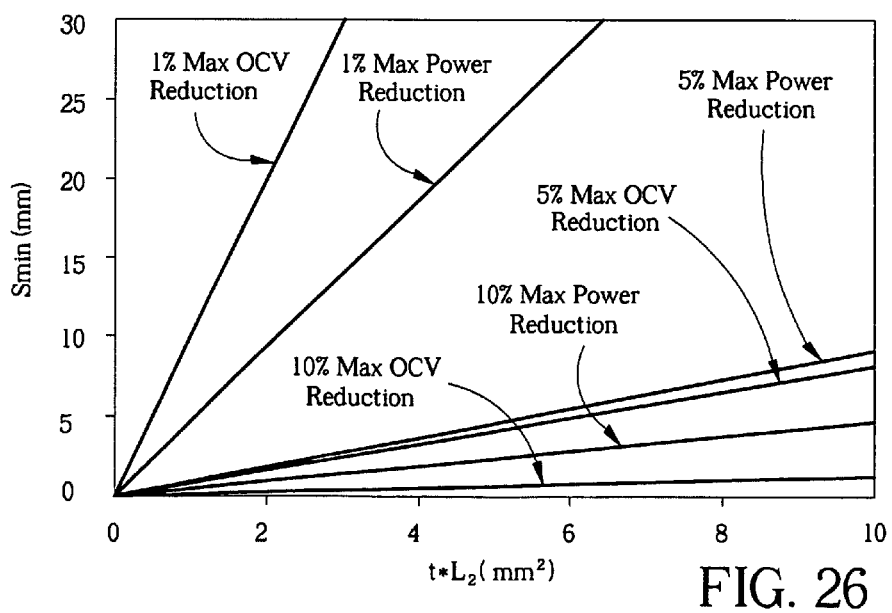
FIG. 26 shows an exemplary graph of adjacent cell distance over cell border area for varying maximum power reductions and maximum operational cell voltages.

According to FIG. 16, proton cross conductivity occurs between adjacent and electrically linked cell elements of a fuel cell 1. In FIG. 16 a cathode diffusion layer 20 of cell A is electrically linked via lead 391 to an anode diffusion layer 20 of cell B, not necessarily by penetrating the interposed electrolyte layer, but eventually through an external electrical circuit. Due to the proximity of the two adjacent cell and the proton conductivity of the membrane layer 10, protons propagate between the cathode diffusion layer 20 of cell A and the anode diffusion layer 20 of cell B and a parasitic voltage potential arises between the cells A and B. The parasitic voltage potential has a degrading influence on the operational cell voltages (OCV) of the affected cell elements. Proton conductivity depends on the structural configuration of the membrane between adjacent cell elements and on the gap distance between the adjacent cell elements and the cell border area of each involved cell element. The cell border area in context with the present invention is the area defined by the border length times the height across both anode and cathode diffusion layers 20 including the membrane thickness. FIG. 25 shows a graph for operational cell voltage (OCV) of cell A over voltage potential of cell B experimentally determined for a cell gap of 13 mm (circle curve), for a cell gap of 4 mm (solid triangle curve), and for a broken membrane considered as ideal proton insulator (solid square curve). FIG. 26 shows various maximum power reduction for a solid membrane in dependence of gap distance Smin, 13 (see FIGS. 12, 17) over cell border area $t^*L_2$.

Best proton insulation is provided by interrupting the path of proton propagation. This is either provided by structural damaging of the membrane or by positioning an proton insulation structure between adjacent cell elements of said fuel cell across a material separation 12 (see FIG. 12) of the electrolyte carrier membrane. As shown in FIGS. 12 and 17, such proton insulation structure may be a fiber-reinforce resin 61. A proton insulation structure may also by provided by a shaped layer. Structural damaging may be accomplished with well-known mechanical and/or chemical material removing techniques such as, for example, stamping or etching.

Accordingly, the scope of the invention described in the specification above is set forth by the following claims and their legal equivalent:

What is claimed is:

1. A fuel cell comprising a shaped layer of a selectively patterned and irradiation cured photo-sensitive material, wherein said shaped layer provides a boundary structure of a vacant passage for conductance of a fluid, and wherein said vacant passage is one of a number of inlet holes and outlet holes directing said fluid through an adjacent diffusion layer in regions between said inlet holes and said outlet holes, wherein said inlet holes are arrayed with respect to said outlet holes in an alternating and interlaced fashion, such that said fluid propagates in the vicinity of said inlet holes through said diffusion layer substantially radially away from said inlet holes, and such that said fluid propagates in the vicinity of said outlet holes through said diffusion layer substantially radially towards said outlet holes.

2. The fuel cell of claim 1, wherein a size and position of said inlet holes and said outlet holes is selected in combination with a thickness of said diffusion layer, such that a dead zone of said diffusion layer is substantially eliminated.

3. The fuel cell of claim 1, wherein said supply channel manifold features supply finger channels and said exhaust channel manifold features exhaust finger channels, and wherein said supply finger channels and said exhaust finger channels are interdigitated and defined within a single contour level of said shaped layer.

* * * * *